I. E. WARD.
AUTOMATIC TIER FOR HAY PRESSES.
APPLICATION FILED DEC. 26, 1911.
1,078,023.
Patented Nov. 11, 1913.
3 SHEETS—SHEET 2.
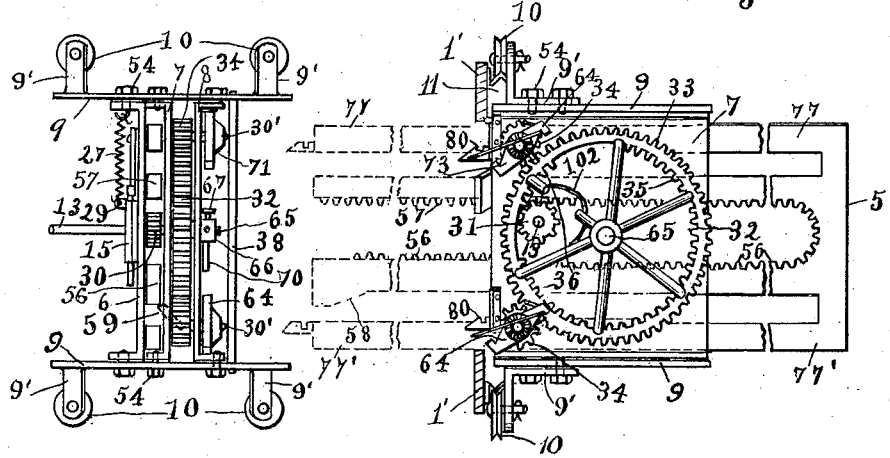
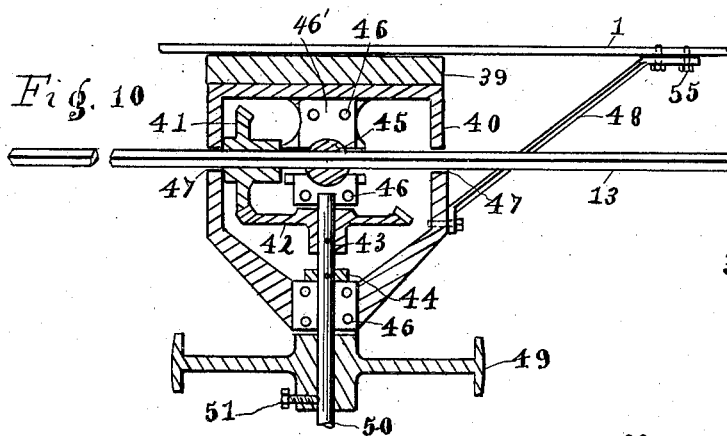
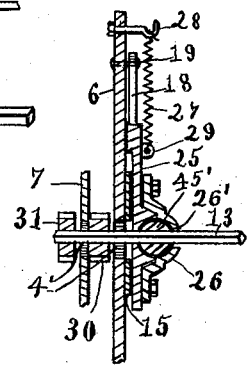
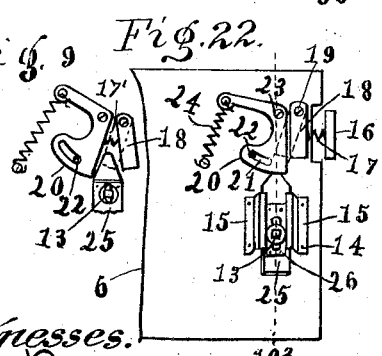
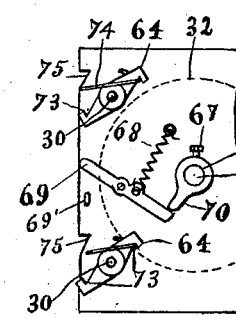
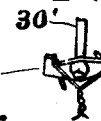
Witnesses.
M. Brown.
Bill Brown.
Inventor.
Isaac E. Ward.

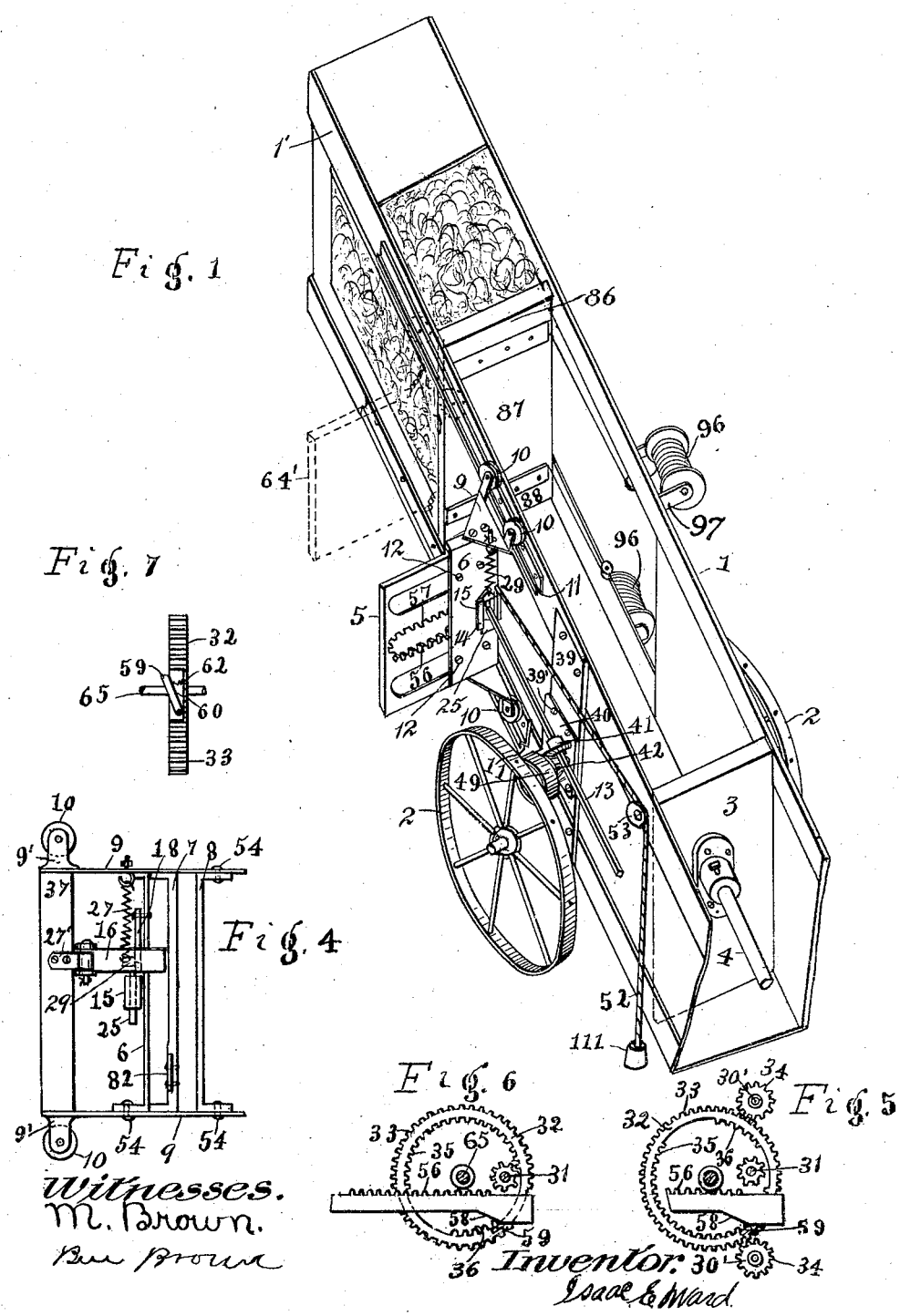

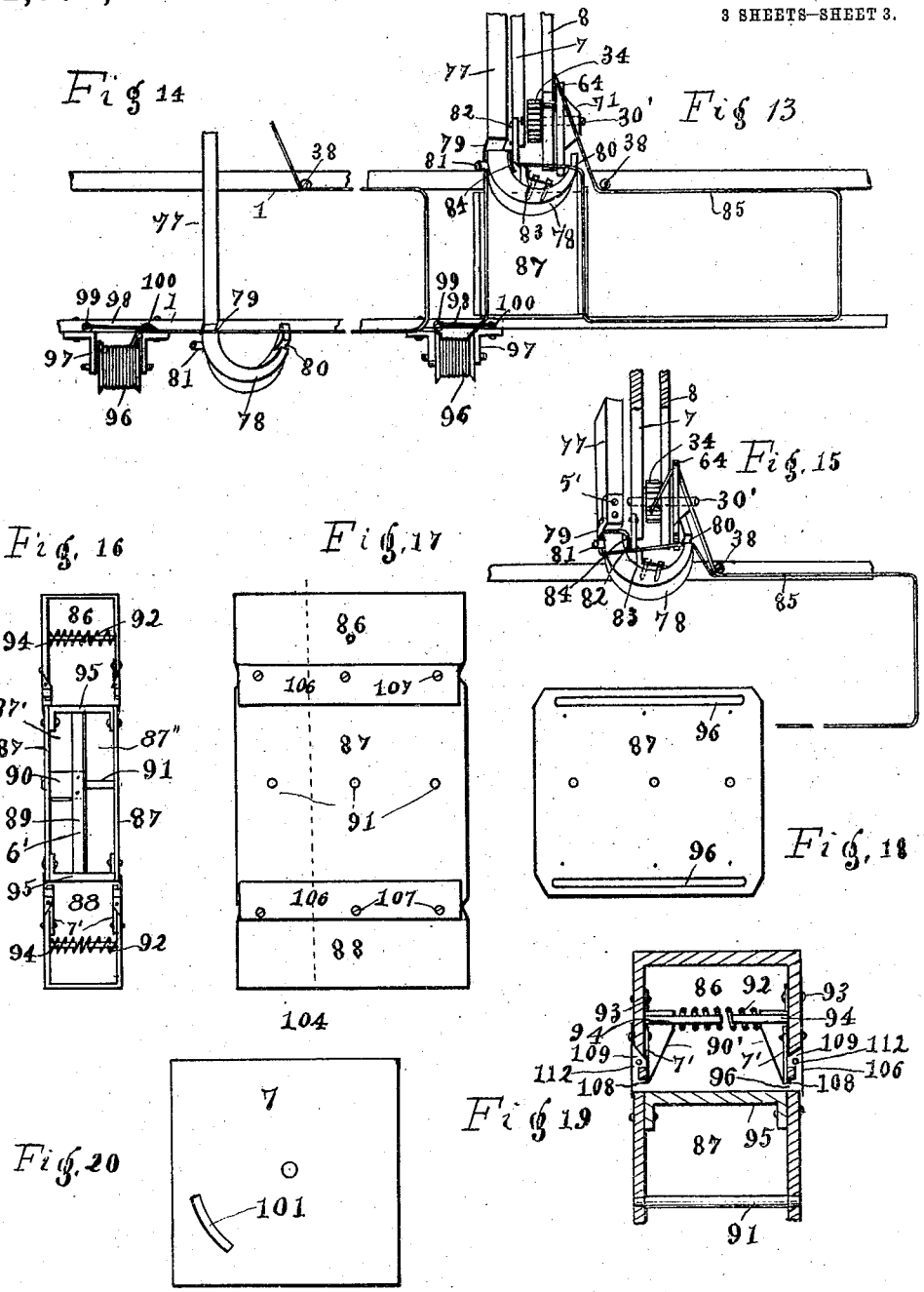

UNITED STATES PATENT OFFICE.

ISAAC E. WARD, OF MOUNT HOPE, KANSAS.

AUTOMATIC TIER FOR HAY-PRESSES.

1,078,023.  Specification of Letters Patent.  Patented Nov. 11, 1913.

Application filed December 26, 1911. Serial No. 667,876.

*To all whom it may concern:*

Be it known that I, ISAAC E. WARD, a citizen of the United States, residing at Mount Hope, in the county of Sedgwick and State of Kansas, have invented certain new and useful Improvements in Automatic Tiers for Hay-Presses; and I do hereby declare the following to be a full, clear, and exact description of the invention, such as will enable others skilled in the art to which it appertains to make and use the same.

My invention relates to automatic bale tying devices for hay-presses and can be attached to any rebounding hay-press and made to automatically act in conjunction with said press.

The invention comprehends the construction and arrangements of parts to be hereinafter illustrated in the accompanying drawings, described in the specifications and succinctly defined in the appended claims.

In the drawings, Figure 1, is a perspective view of a part of a hay baler showing my automatic tier attached thereto. Fig. 2, a side elevation of the device with one of the side plates removed. Fig. 3, an end view of the same before said plate was removed. Fig. 4, an end view of Fig. 3, showing additional features of construction. Figs. 5, and 6, illustrate certain movements of the device when in operation. Fig. 7, an edge view of the main operating wheel having a portion of its periphery removed to show a pivoted dog, the free end of which moves laterally to the plane of the wheel. Fig. 8, the plate which was said to have been removed from Fig. 2, and other features of construction which will be referred to later. Fig. 9, illustrates the construction and coöperation of parts for starting and stopping the tier. Fig. 10, a bracket carrying a power shaft and a drive pulley. Fig. 11, a vertical sectional view in part of Fig. 22, taken on the dotted line 103. Fig. 12, a sectional view of the wire-twister 64. Figs. 13, 14, and 15, illustrate the wire manipulating and tying device. Fig. 16, an end elevation of the baling block. Fig. 17, a side elevation of the central block. Fig. 18, a side elevation of the central section of said block. Fig. 19, a vertical sectional view of Fig. 17, taken on the dotted line 104. Fig. 20, the plate 7, as shown in Fig. 3. Fig. 21, illustrates the wire twister in the act of twisting the ends of the wire together. Fig. 22 illustrates the coaptation of parts.

Similar numerals designate similar parts throughout the several views.

Referring to the drawings 1, designates a portion of a rebounding hay press mounted upon wheels 2, and a packer head 3, attached to the plunger beam 4. As I make no claim upon this part of a press, no explanation is necessary. Upon the side bars 1', are affixed V shaped wheel-tracks 11, upon which travel grooved rollers 10, bearing a carriage, made preferably of plates of sheet steel 6—7 and 8, said plates have lateral bends and are affixed to plates 9, having perpendicular lugs 9', with rivets or cap screws 54. Stay-bolts 12, hold plates 6 and 7 from spreading apart. Between plates 6 and 7, is slidably positioned a four fingered rack 5, (best shown in Fig. 2) the central two fingers having cogs 56 and 57, the lower finger of said two has a downward incline 58, which will be referred to later. A spur-wheel 32 (Fig. 2) is made with internal cogs 35, and a rectangular recess 60, Fig. 7, in the side of the rim in which is pivoted a dog 59, and a coiled spring 62, continuously keeps the edge pressed out. Said wheel is mounted upon an arbor 65, which is journaled in the plates 7 and 8 (Fig. 3). In said plates are also journaled arbors 30' and 30', see Fig. 3, which carry pinions 34—34. On the ends of said arbors outside of plate 8, are wire-twisters 64—64. Said twisters are of the form shown in Figs. 8—12 and 21. Fig. 12, is a vertical sectional view showing the cone shaped hub 71. of the twister within which is placed a spiral spring 72. The ends of said arbors are threaded to receive nuts 65''. A portion of said shafts are splined which prevents the twister from turning thereon, the twisters being slidably mounted on said shafts so that when the nut 65', is turned any desired tension may be attained for the purpose of holding the wire between the said twister and the plate 8 (see Fig. 8).

A bracket 40, (Fig. 10) is made with journal bearings in the central portion and is designed as a housing for a pair of bevel wheels 41 and 42. An inner extension 46" is made having a horizontal groove and the central portion is made with hemispherical recess to receive a spherical bearing 45, having a square hole therein to receive a square power shaft 13. The holes 46, are for the reception of bolts or cap-screws for a boxing which has a transverse groove and a hemispherical recess, being similar to cap 26

(Fig. 11). Elongated openings 47, are made in the bracket 40. The object of this construction is to allow the end of the shaft 13, to slide longitudinally through the ball 45, and the ends of said shaft to freely move up and down and at the same time freely rotate the ball. The necessity of this movement will be referred to later. On said shaft 13, is a bevel-wheel 41, having a square hole therein of a size to fit the shaft so that the shaft will rotate said wheel and also slide back and forth. In the end of the member 46′ is a bore in which is journaled the end of a shaft 50. Adjacent the end thereof is a bevel wheel 42, which engages bevel wheel 41, and is affixed on said shaft with a key 43. A collar 44, is keyed on the said shaft against the shaft bearing which serves to keep the wheels 41 and 42 in gear. A driven wheel 49, is affixed to the said shaft 50, with a set screw 51. The bracket 40, is secured to the side bar 39, of the baler by means of screws 39′ and a brace 48, extends therefrom to the baler and is secured thereto by bolts 55. The end of the shaft 13, whose bearing 45 I have described, extends forward into the carriage as best seen in Figs. 1 and 3, and has two pinions 30 and 31, thereon, 30 being between plates 6 and 7 and 31, between plates 7 and 8. In the operation of my device it is necessary that this end of the shaft 13, move freely up and down and also continue to rotate with a minimum of friction, part of the time said shaft is running idle and part of the time it is engaged operating the fingered cog rack, part of the time it imparts an intermittent rotative movement to the spur-wheel 32. And to this end special attention is given to the construction as shown in Figs. 2—5—6—9 and 11. I will describe the bearing of the end of the shaft 13, as shown in Fig. 11, it being taken on the dotted line 103, of Fig. 22. The member 25, is made of the shape shown in Fig. 11, having a cap 26, with an opening 26′, through which said shaft passes and can play up and down. Between this cap and the member 25, is a globular recess of a size to fit the ball 45′, which has a square hole therethrough and allows the square shaft 13, to freely slide back and forth therethrough and when the member 25, is moved up and down the shaft is free to move in any direction while rotating. Angle plates 15, (see Fig. 22) are affixed to plate 6, with rivets 14, so as to allow the member 25, to slide up and down. The top end of 25, is substantially A shaped nd has a lateral lug 29, (see Fig. 11,) from which extends vertically a spiral spring 27, the upper end of the spring being affixed in any suitable manner as at 28. Openings 4′, are made in the plates 6 and 7, of a size to allow the shaft 13, to freely move up and down. The pinion 30, (Fig. 3) engages the cogs 56 and 57 (Fig. 2), and pinion 31, engages the inner cogs of the spur-wheel 32. It is to be noted that there are two spaces in wheel 32, where there are no inner cogs.

Referring to Fig. 9, I have provided two dogs 18 and 20, pivotally affixed to the plate 6, with screws or rivets 19 and 23. Dog 20, is somewhat curved at its lower end and has a curved opening 21. A pin 22, in the plate 6, is located to limit the movement of said dog. An arm extends laterally from the top of said dog to which is attached a spiral spring 24, the other end of the spring being affixed to a screw in plate 6.

Referring to Fig. 4, I have shown a vertical bar 37, having lateral bends (not shown) riveted to the plate 9. To said bar is attached a plate 27′ and to the free end thereof is hinged a plate 16, and between this plate and the dog 18, is a spiral compression spring 17, see Fig. 22, and when the dog 18, and 20, and the plate 16, are in a normal position they are as shown in Fig. 22. On the end of, (see Fig. 15,) the finger bars 77 and 77′, see Figs. 13 and 14 and dotted lines in Fig. 2, are hooks 78, approximately semicircular having notches 79 and 80 and a lateral pin 81. The ends of the finger bars are halved off as are the hooks and are riveted or bolted together as shown at 5′. Riveted to the end of the hook 78, is a wire cutter 83, having a vertical edge and extending somewhat above the plane of the hook.

Lugs 97, are secured to the baler and carry journals for spools of wire 96. A pin 100 extends out of the baler around which the wire passes which serves to keep it in proper position. A spring 98, is attached to the baler with a screw 99, and when this screw is turned down it causes the spring to press down on the wire and keeps the wire spool from over-running.

In conjunction with my bale tying device I use an improved bale block (Figs. 16—17 and 18) made in three sections 86—87 and 88, preferably of sheet steel. Section 87, has horizontal apertures 96, said section is supported against outside pressure by stay bolts 91. A vertical bar 6′ (Fig. 16) is given bends (not shown) and is riveted to the plates 95, which plates are bent and riveted to the plates 87. And to the bar 6′ is riveted a lateral plate 90. Sections 86 and 88 are exactly alike so that the description of one will suffice for both. Extending perpendicular to the plane of the inner side of the block section 86, are opposing studs 94, having a space between the ends. On said studs are placed a strong spiral spring 92, the free ends of which bear against bends of a brace 90′, one end of which is affixed with rivets 93, to the block section. The other end is pressed by spring 92 against the plate 7′.

Said plate is in form similar to plate 106, but has a lateral bend 108. Said plates are placed inside the block section (best shown in Fig. 19) and secured thereto with the same bolts as in plate 106. The said bend is positioned in the openings 96, below the block section 87. It is obvious that when the block section 86, is to be connected to section 87, it can be accomplished by compressing the spring 92. The free edges 109, are beveled off to allow the wire to more easily escape.

It is to be particularly noted the reason I have constructed a movable carriage is that when the machine is in the act of tying and reaching for another wire the packer may be moving the carriage blocks and hay bale. Hence I have constructed a device that will operate on the move as well as when standing still, and when the carriage has reached the limit of its movement I have provided means for automatically returning it home. This I accomplish by a rope 52, attached to the carriage and extending over a grooved pulley 53 and a weight 111, on the free end of said rope.

Referring to Fig. 8, it will be seen I have pivoted a bar 69, to the plate 8, and have attached thereto a spiral spring 68. A collar 66, has extending therefrom an arm 70, which engages the pivoted bar and holds it in a normal position, said collar being adjustably affixed by a set screw 67, to the spur-wheel shaft 65.

Having described the construction and assembling of my device I will now describe its *modus operandi*. To describe the tying of one wire will suffice as both wires are manipulated the same.

When it is desired to operate the machine, the wire is taken off the spool and placed under the pin 81, (Fig. 15) and in the notch 79, and the finger 77, pushed back until the free end of the wire is held by friction between the hook and the knife 82, see Figs. 13 and 15. It is to be observed the shaft 13, is continually rotating and the pinion 30 and 31, are running idle and when the packer pushes the hay back against the wire 85, it will be as shown in Fig. 15. The pressure of the hay having pressed against the hinged plate 16, will through the medium of the spring 17, push the pivoted dog 18, against the dog 20, and off the member 25, at which time the spring 27, will draw the member 25, up against dog 18, which is then in the position as indicated by the dotted lines in Fig. 22, raising the pinion 31, into an intermediate position as shown at Fig. 5. The bale block (Fig. 16) is then set in with the plate 90, adjacent the hinged plate 16, and when the hay packer pushes the block along so that the hinged plate 16, moves laterally into the hollow of the block 87', and the spring 17' will throw the plate 16, and the dog 18, back to their normal position as shown in Fig. 9, and the spring 27, will raise the member 25, between the dogs 18 and 20, (see Fig. 9) bringing the pinions 30 and 31 up into the top position as shown in Fig. 2, which engage the cogs 36, and 57, and thereby impart an intermittent rotative movement to the wheel 32, coincident therewith said wheel also intermittently rotates the pinion 34, and through the medium of the shaft 30', causes the wire twister 64, to take hold of said wire as shown at Fig. 2, a slight movement of the finger having released the end of the wire, and it is taken up as indicated, the rod 38, keeps the wire against the bale. Simultaneously with the movement of the twister 64, the intermittent movement of the wheel 32, causes the arm 70, to release the pivoted bar 69, which drops down into the hollow 87' of the bale block and the carriage and the bale block move on together. The bale block 87, being in the position shown at Fig. 13, the pinion 30, having become engaged with the cogs 57 (Fig. 2) the finger 77, is run across the baler as shown at Figs. 13 and 14, said pinion having followed the cogs around the bars and when engaged with cogs 56, runs the rack back home and takes the wire back with it, the wire having been caught in the notches 79, and 80, of the hook 78. The wire is then in the position as shown in Fig. 13. The members 90', Fig. 19, being laterally inclined cause the wire to pass down under the end of the plate 7' and into the position at 112. It is to be specially observed that at the instant the cog rack lands at home the incline 58 (see Fig. 6) contacts the pivoted dog 59 (it having passed through the opening 101, Fig. 20, in the plate 7) and starts the wheel 32, and thereby brings the cogs 35, in contact with the pinion 31, and the end of the twister takes hold of the wire and pulls it back in the notch 75, in the plate 8. The wheel continuing to rotate and through the medium of the pinion 34, twists the ends of the wire together as shown at Fig. 21, meantime while the twister was putting the wire taut the knife 82, was making a bend 84, in the wire after which it cut it off and the free end of the wire remained held between the knife and the hook. Moreover during the process of twisting the ends of the baling wire the revolution of the wheel 32, brought the arm 70, around in its rotation and lifted the pivoted bar 69, out of the bale block, thereby separating the carriage and block and the weighted rope 52, returned the carriage from its recent position as indicated by the dotted lines 64, to its normal position as shown at Fig. 1. The hay plunger again begins to move the block and bale of hay by packing more hay against the block. When the bale block passes out of the baler the wire will come out of the block by passing down beside the plate 106.

What I claim is:—

1. In an automatic bale tier for hay presses, a baler, V shaped tracks affixed to said baler, a carriage movably mounted upon said tracks, means for intermittently moving said carriage upon said tracks and means for returning said carriage to its normal position, a fingered rack, an incline on the free end of two of said fingers to insure the grasping of the wire, cogs on two of said fingers and means for reciprocally moving said rack in said carriage.

2. In an automatic bale tier for hay presses, a baler, V shaped tracks affixed to said baler, a carriage movably mounted upon said tracks, means for intermittently moving said carriage upon said tracks and means for returning said carriage to its normal position, a fingered rack, an incline on the free end of one finger, cogs on two of said fingers and means for reciprocally moving said rack in said carriage, a spur wheel revolubly mounted in said carriage, internal cogs in said wheel, blank spaces between said cogs, an outward spring pressed pivoted dog in the rim of said wheel and means to engage said dog to impart an intermittent rotative movement to said wheel, and a pinion to continue the movement of said wheel for a time.

3. In an automatic bale tier for hay presses, a carriage movable upon tracks affixed to said baler, a fingered rack movably mounted in said carriage and means for reciprocally and intermittently moving said rack, and a spur wheel mounted to rotate in said carriage simultaneously with the movement of said rack, a power shaft having pinions thereon and means for rotating said shaft means to shift the end of the shaft to engage the pinions with the aforesaid rack and spur-wheel and pinions in said carriage actuated by said wheel to operate a wire twister.

4. In an automatic bale tier for hay presses, a carriage movably mounted upon tracks affixed to said baler, a fingered rack movably mounted in said carriage and means for reciprocally and intermittently moving said rack, a spur-wheel mounted to rotate in said carriage simultaneously with the movement of said rack, a power shaft having pinions thereon and means for rotating said shaft, means to shift the end of the shaft to engage the pinions with the aforesaid rack and spur-wheel and pinions in said carriage actuated by said wheel to operate wire twisters, and means on said fingers for grasping the wire and means for twisting the end of the baling wire together when drawn taut around the bale.

5. In an automatic bale tier for hay presses, a carriage movably mounted on said press, V shaped tracks affixed to said press, a bar having fingers and a spur-wheel, mounted in said carriage, means operated by the spur-wheel for grasping and twisting the ends of the baling wire together, hooks affixed to said fingers, notches in said hooks to catch the wire and means to send the hooks after the wire, a lateral pin for guiding the free end of the wire after being cut off.

6. In an automatic bale tier for hay-presses, a movable carriage having two compartments, a bar having fingers and a spur-wheel mounted in said compartments, notched hooks affixed to two of said fingers, cogs extending continuously from one of said fingers to the other finger, an incline on the free end of one finger, a pivoted dog extending laterally from the rim of the aforesaid spur wheel and through an opening from one compartment to the other compartment whereby the said incline engages the said dog and imparts to said wheel an intermittent movement; a square shaft longitudinally movable and revolubly mounted parallel to the baler, one end of which is adjustably positioned in the carriage, pinions on said shaft within said carriage to engage the aforesaid spur-wheel and rack whereby they are intermittently actuated.

7. In an automatic bale tier for hay presses, a bracket affixed to said carriage, a globe in said bracket, a square hole through said globe, a square shaft extending movably through said globe, a bevel-wheel slidably mounted upon said shaft, pinions on said shaft, an arbor journaled in said bracket, a bevel wheel affixed to said arbor to engage the aforesaid bevel wheel and a driven pulley on said arbor whereby the square shaft is rotated, the end of said shaft being movably positioned in said carriage and means affixed to said carriage whereby the said shaft can be moved up and down and means within said carriage to engage the pinions on said shaft whereby the ends of the wire is twisted together when around the bale.

8. A movable carriage having a plurality of compartments grooved wheels pivoted to said carriage, V shaped tracks for said wheels to ride upon, a movable finger rack in said carriage, a revoluble spur-wheel having spaced internal cogs mounted on an arbor and journaled in said carriage, an arm affixed to the arbor of said wheel outside of said carriage, and a pivoted spring actuated-bar affixed to said carriage whereby it is alternately released and engaged by the arm aforesaid to cause the carriage and block to move together in combination with means for grasping and twisting the wire when around the bale.

9. A baling block in three sections, the end sections being removable from the central section, lateral studs on the inner walls of the outer sections, spiral springs on said studs, angled arms affixed to said walls, said arms having bends against which the said springs press, plates on each side of said wall, one of said plates having a lateral bend which enters the opening in the wall of the central section whereby the sections are held together, angle bars uniting the walls of the central section, a bar affixed to the aforesaid angle bars centrally located between the outer walls of said section and a bar extending laterally from the bar aforesaid into contact with the outer wall.

10. A wire twister having lateral lugs on opposite sides thereof, a cone projecting laterally from said twister a recess in said cone, a splined arbor in said cone and twister and a spiral spring around said arbor and in the aforesaid recess and means on said arbor to tension the spring to press the twister against the wall of the carriage whereby the gripping power of the wire twister may be increased or diminished as described and set forth.

In testimony whereof, I have signed this specification in the presence of two subscribing witnesses.

ISAAC E. WARD.

Witnesses:
M. BROWN,
G. R. WALKER.

Copies of this patent may be obtained for five cents each, by addressing the "Commissioner of Patents, Washington, D. C."